(12) United States Patent
Repke et al.

(10) Patent No.: US 10,029,925 B2
(45) Date of Patent: Jul. 24, 2018

(54) APPARATUS AND METHOD FOR CLEANING WATER

(71) Applicant: akvola Technologies GmbH, Berlin (DE)

(72) Inventors: Jens-Uwe Repke, Berlin (DE); Guenter Wozny, Glienicke/Nordbahn (DE); Matan Beery, Berlin (DE)

(73) Assignee: akvola Technologies GmbH, Berlin (DE)

( * ) Notice: Subject to any disclaimer, the term of this patent is extended or adjusted under 35 U.S.C. 154(b) by 902 days.

(21) Appl. No.: 14/397,556

(22) PCT Filed: Apr. 18, 2013

(86) PCT No.: PCT/EP2013/058079
§ 371 (c)(1),
(2) Date: Oct. 28, 2014

(87) PCT Pub. No.: WO2013/167358
PCT Pub. Date: Nov. 14, 2013

(65) Prior Publication Data
US 2015/0114910 A1    Apr. 30, 2015

(30) Foreign Application Priority Data
May 9, 2012    (DE) .................. 10 2012 207 731

(51) Int. Cl.
*C02F 1/24*       (2006.01)
*C02F 9/00*       (2006.01)
(Continued)

(52) U.S. Cl.
CPC ............ *C02F 1/24* (2013.01); *B01D 21/0042* (2013.01); *B01D 21/0084* (2013.01);
(Continued)

(58) Field of Classification Search
CPC ........ C02F 1/24; C02F 1/444; C02F 2101/30; C02F 2103/081; C02F 2101/327;
(Continued)

(56) References Cited

U.S. PATENT DOCUMENTS

| 3,433,359 A * | 3/1969 | Lundin ................. B01D 24/22 |
| | | 210/199 |
| 4,957,633 A * | 9/1990 | Suutarinen ................ C02F 1/24 |
| | | 210/705 |
| 5,130,029 A | 7/1992 | Suutarinen |
| 6,017,449 A * | 1/2000 | Eriksson ............. B01F 3/04262 |
| | | 210/194 |
| 2004/0217058 A1 | 11/2004 | Cadera et al. |

(Continued)

FOREIGN PATENT DOCUMENTS

| CA | 2527525 A1 | 5/2007 |
| DE | 19647512 A1 | 5/1998 |

(Continued)

*Primary Examiner* — Thomas M Lithgow
(74) *Attorney, Agent, or Firm* — The Webb Law Firm

(57) ABSTRACT

The present invention relates an apparatus for cleaning water, in particular precleaning seawater, including at least one tank for receiving water containing at least one flocculating agent for separating organic and possibly biological constituents contained in the water. The at least one tank includes at least one contact zone K for contacting the water containing the flocculating agent with at least one gas, in particular air, and at least one separation zone S for separating the flocculated organic constituents buoyed up by the gas. At least one gassing unit is arranged in the at least one contact zone K and at least one filtration unit is arranged in the at least one separation zone S. The at least one gas is injected via the at least one gassing unit without using a liquid carrier.

23 Claims, 4 Drawing Sheets

(51) Int. Cl.
   *B01D 21/00* (2006.01)
   *B01D 21/01* (2006.01)
   *C02F 1/44* (2006.01)
   *C02F 101/30* (2006.01)
   *C02F 103/08* (2006.01)
   *C02F 1/52* (2006.01)
   *C02F 101/32* (2006.01)

(52) U.S. Cl.
   CPC .............. *B01D 21/01* (2013.01); *C02F 1/444* (2013.01); *C02F 1/5245* (2013.01); *C02F 2101/30* (2013.01); *C02F 2101/327* (2013.01); *C02F 2103/08* (2013.01)

(58) Field of Classification Search
   CPC ............... C02F 2103/08; C02F 1/5245; B01D 21/0042; B01D 21/0084; B01D 21/01
   See application file for complete search history.

(56) References Cited

U.S. PATENT DOCUMENTS

| | | |
|---|---|---|
| 2009/0211974 A1 | 8/2009 | Bonnelye et al. |
| 2014/0014562 A1* | 1/2014 | Woo .................. C02F 1/001 210/137 |
| 2015/0218012 A1* | 8/2015 | Gaid .................. C02F 1/24 210/703 |

FOREIGN PATENT DOCUMENTS

| | | |
|---|---|---|
| DE | 10118940 A1 | 10/2002 |
| DE | 102007007894 A1 | 8/2008 |
| JP | 10109091 A | 4/1998 |
| WO | 9831634 A1 | 7/1998 |
| WO | 2008013349 A1 | 1/2008 |
| WO | 2009043760 A1 | 4/2009 |
| WO | 2011026758 A1 | 3/2011 |

* cited by examiner

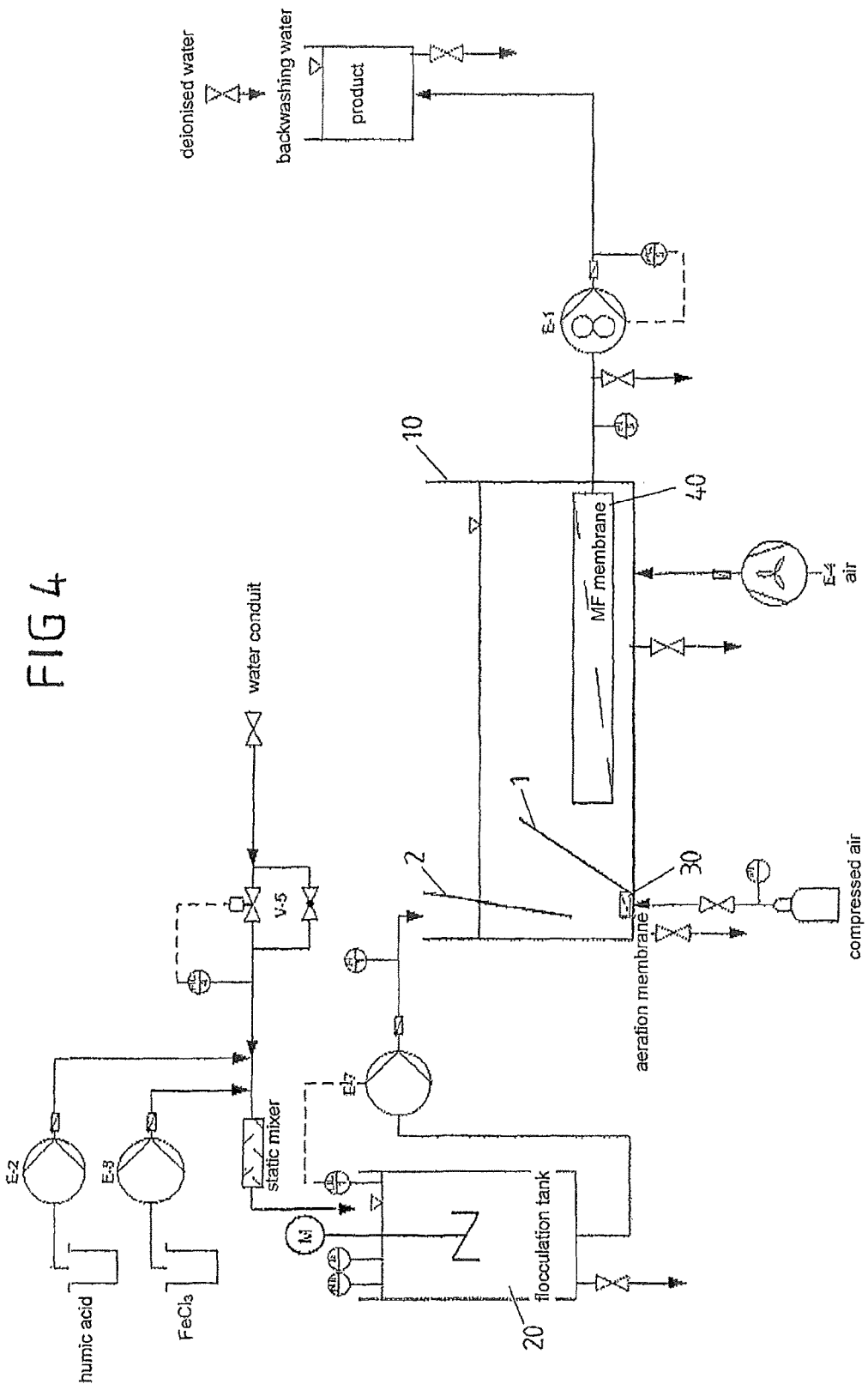

US 10,029,925 B2

APPARATUS AND METHOD FOR CLEANING WATER

CROSS-REFERENCE TO RELATED APPLICATIONS

This application is the United States national phase of International Application No. PCT/EP2013/058079 filed Apr. 18, 2013, and claims priority to German Patent Application No. 10 2012 207 731.6 filed May 9, 2012, the disclosures of which are hereby incorporated in their entirety by reference.

BACKGROUND OF THE INVENTION

Field of the Invention

The present application relates to an apparatus for cleaning water and to a method for cleaning water.

Description of Related Art

Providing freshwater for the sufficient supply of the continuously growing world population is one of the greatest challenges the world community will have to face in the coming decades.

Due to the limited resources for the provision of freshwater, it is increasingly required to develop and provide suitable alternatives, in particular on the basis of seawater, for the sufficient supply with drinking water.

In the 50's and 60's of the past century, for example, first large-scale industrial seawater desalination plants already were put into operation in the Middle East, in which the salt was thermally separated from the water by means of evaporation and condensation. In a development of the seawater desalination plants, the first reverse osmosis plants for seawater desalination were established in the 1970ies, whose operation energetically is much more favorable as compared to a purely thermal water treatment.

The reverse osmosis is a physical method for concentrating substances dissolved in liquids, in which the natural process of osmosis is reversed with pressure. On one side of a semipermeable membrane, a pressure greater than the natural osmotic pressure is generated. In the case of the seawater desalination, the seawater is pressed through a semipermeable membrane of polyamide, PTFE or sulfonated copolymers with a pore diameter of $5 \times 10^{-7}$ to $5 \times 10^{-6}$ mm under high pressure, in order to overcome the osmotic pressure. The semipermeable membrane acts like a filter and merely allows water molecules to pass through the membrane, whereas salts and other substances, such as bacteria and viruses or also toxic substances, such as heavy metals, are retained, so that clean drinking water is obtained. The osmotic pressure rises with increasing salt concentration, so that the process would stop at some time. To counteract this, the concentrate is discharged. One of the greatest problems in the reverse osmosis consists in that retained or filtered substances are deposited on the membrane, which cause membrane fouling. To counteract the undesired membrane fouling, the water to be cleaned should be free from coarse particles, organic substances and impurities as far as possible, before it gets into the reverse osmosis plant. Accordingly, the process of seawater desalting requires a thorough precleaning of the seawater to be desalted.

Various methods and apparatuses have been used in the past for precleaning the water, in particular salt water. For example, corresponding plants can be equipped with prefilters, which provide for a separation of coarse matter up to a particle size of 20 µm. Additional activated carbon filters provide for the separation of organic substances, such as for example plant protection agents or other toxic substances. It is also possible to establish a UV irradiation in a precleaning step, whereby a multitude of germs harmful to health, such as viruses and bacteria, can be killed.

An approach for water precleaning for a reverse osmosis, which has been established in the past years, is represented by the method of Dissolved Air Flotation (DAF). DAF is a special form of flotation. Flotation is a gravity separation method for separating solid-liquid or liquid-liquid systems. In the process, gas bubbles are generated, for example from air, and introduced into the liquid phase, wherein hydrophobic particles present in the liquid phase, such as organic substances, attach to these likewise hydrophobic bubbles and due to the increased buoyancy caused by the gas bubbles rise to the surface. On the surface of the liquid phase, these agglomerates accumulate to form a sludge layer, which is easily separable mechanically.

In the DAF method, a gas present in a liquid at elevated pressure in dissolved form is introduced into the liquid to be cleaned. Due to the pressure drop in the liquid to be cleaned, the gas escapes in the form of tiny bubbles, which have a diameter in the micrometer range. The ascending gases thus have a very high specific surface, to which the hydrophobic particles from the salt water to be cleaned can attach. The flotation, in particular DAF, therefore is suitable for separating suspended matter with very small density, such as for example microalgae, or for separating organic hydrophobic ingredients.

In detail, a DAF apparatus comprises a flocculation unit for flocculating the suspended matter and organic ingredients, and a so-called flotation cell. The soiled water provided with a suitable flocculating agent exits from the flocculation unit into the contact zone of the flotation cell, into which water supersaturated with gas is injected and with which dirty water that has entered into the contact zone gets in direct contact. Due to the reduced pressure existing in the flotation cell, the gas bubbles exit from the injected solution and microbubbles with diameters of 10 to 100 µm are formed. This bubble sponge is called "white water". These tiny bubbles attach to the flocculated particles and ascend into the separation zone of the flotation cell in the form of an agglomerate or mixture of floccules and gas bubbles. Due to the ascent of the agglomerate of floccules and gas bubbles, a layer of solids (so-called float) is formed on the water surface of the flotation cell, which is separated mechanically for example with scrapers and collected. Below this layer of solids or float layer the cleaned water is present, which after supersaturation with a corresponding gas is at least partly recirculated into the contact zone of the flotation cell. The other part of the cleaned water is discharged for the further use.

The DAF method provides for a very good separation of microalgae and other microorganisms from highly loaded salt water, but requires a relatively high energy consumption due to the supply of air by means of a saturator into the recycled partial stream. By means of DAF it is not possible either to treat very turbid and extremely muddy water.

SUMMARY OF THE INVENTION

An object of the present invention thus consisted in providing an apparatus and a method by means of which the disadvantages of the known flotation methods, in particular of the DAF method, can be reduced or overcome.

This object is solved with an apparatus with the features of claim 1 and by means of a method according to claim 21.

An apparatus for cleaning water, in particular salt water or seawater, comprises at least one tank for receiving water mixed with at least one flocculating agent for separating organic and possibly biological constituents such as e.g. microalgae contained in the water, at least one gassing unit arranged in the tank, and furthermore at least one filtration unit. The at least one tank also can be referred to as flotation cell or purification tank.

According to the invention the present tank (flotation cell) comprises at least one contact zone for contacting the water containing the flocculating agent, such as e.g. the liquid stream from the flocculation unit into the tank, with at least one gas, in particular air, for forming an agglomerate of floccules and gas bubbles as well as at least one separation zone for separating the flocculated organic constituents buoyed up by the gas.

According to the present invention the at least one gassing unit is arranged in the contact zone of the tank, and the at least one filtration unit is arranged in the separation zone of the tank.

The present apparatus is characterized in that the at least one gas for forming the agglomerate of floccules and gas bubbles is injected into the tank via the at least one gassing unit arranged in the contact zone of the tank without the use of a liquid carrier. As will be explained later in detail the gas is thus introduced directly into the tank without previous dissolving or pressing into a liquid.

The at least one filtration unit is arranged offset to the gassing unit, preferably offset along a horizontal plane of the tank. "Offset" in the sense of the present invention means that the filtration unit is arranged offset laterally or spatially from the gassing unit; filtration unit and gassing unit thus are not arranged vertically one above the other and do not overlap, but preferably are arranged one beside the other or adjacent to each other along a horizontal plane of the tank. Thus, the gas bubbles exiting from the gassing unit do not directly and immediately impinge on a filtration unit located vertically above the gassing unit. Filtration unit and gassing unit are arranged in spatially different regions or zones of the tank.

Upstream of the at least one tank, a flocculation unit can be provided for receiving the water to be cleaned and at least one flocculating agent for flocculating organic constituents contained in the water. Flocculation unit and tank preferably are in liquid communication with each other, and the organic constituents flocculated in the flocculation unit can be transported from the flocculation unit into the tank by means of a liquid stream.

The flocculation unit can be either designed as unit separated from the tank or can be integrated into the tank, i.e. can be formed in one piece with the tank. When integrating the flocculation unit into the tank, the flocculation unit may comprise at least one, preferably two sections or areas separated from the actual flotation cell. The water to be purified and the flocculating agent are introduced into this separated area and optionally are intensively mixed using a stirrer. The water mixed with the flocculating agent may then introduced for instance either into a second area separated from the flotation cell of the tank, to which may be for instance further flocculating auxiliary agents are introduced, or is fed directly into flotation cell into the contact zone of the flotation cell, i.e. in direction of the gassing unit.

The present apparatus thus combines the method of flotation with a membrane filtration. Due to the additional membrane filtration, a better cleaning of the water is effected as compared to a mere flotation. Conversely, the membrane filtration can be carried out more effectively, since before the filtration particles have already been removed by flotation. Due to the combination of flotation and filtration in one single tank, the process dynamics are improved, since a smaller tank in the form of a flotation cell can be used and a higher throughput is achieved. A recycle stream, i.e. no recirculation as in case of DAF, is no longer necessary either, as will be explained below. This in turn leads to the fact that the energy demand of pumps becomes smaller and the space requirement as a whole also is smaller. The present process only produces very little waste water, since the layer of solids can directly be separated with a very small water content. All of these factors have a positive effect on the economy and environmental compatibility of the present method. With the present method, both process integration and process intensification are possible, which lead to a smaller space requirement and lower investment and operating costs and additionally improve the cleaning result.

The tank used in the present apparatus, for example in the form of a flotation cell, preferably is formed in the form of a tank or basin open on an upper side opposite the bottom surface with the length a, the width b and a height h, wherein preferably a>b and a>h. Width b and height h can be the same or different. The tank thus preferably comprises two oblong side walls and two short side walls. Accordingly, a tank which has a rectangular configuration is particularly suitable as flotation cell or purification basin. The tank accordingly includes six rectangular surfaces or walls, wherein the surface formed of a×b is described as bottom surface or open side or surface opposite the bottom surface, the surfaces formed of a×h are described as oblong side walls, and the surfaces formed of b×h are described as short side walls of the tank. The above-mentioned horizontal plane of the tank preferably extends parallel to the length a of the tank.

As explained above, the contact zone is the region in which the liquid stream from the flocculation unit gets in contact with the introduced gas and an agglomerate of floccules and gas bubbles is formed. The region of the contact zone preferably is determined by the arrangement or positioning of the gassing unit in the tank or basin bottom. The region of the contact zone thus can have a length which lies in a range between 0.15-0.25 times, preferably 0.2 times the length a of the tank, and has a width which corresponds to the width b of the tank. The height of the contact zone is determined by the liquid level of the water containing the flocculating agent in the tank.

The separation zone is the region of the tank in which the flocculated organic constituents buoyed up by the gas are separated from the water. This separation of the organic agglomerates buoyed up preferably is effected on the surface by means of suitable mechanical means such as cleaning device e.g. scrapers. Such means are known to the skilled person.

The separation zone comprises a region of the tank larger than the contact zone. For example, the separation zone preferably comprises a region with a length which corresponds to 0.75-0.85 times, preferably 0.8 times the length a of the tank. The width of the separation zone corresponds to the width b of the tank. The height of the separation zone is determined by the liquid level of the water containing the flocculating agent in the tank.

The transition between contact zone and separation zone in the tank preferably is fluent, i.e. there is no sharp spatial separation of contact zone and separation zone in the tank. Merely a baffle plate described below can be regarded as a kind of spatial boundary or parting line between contact zone and separation zone.

In one exemplary embodiment of the present apparatus, the at least one filtration unit in the flotation cell as tank is arranged below the layer formed by the flocculated organic constituents buoyed up. Particularly preferably, the at least one filtration unit is arranged at the bottom of the tank within the separation zone. In other words, the filtration unit is arranged immersed in the separation zone of the tank.

The filtration unit in particular has a rectangular shape adapted to the flotation cell. The length of the filtration unit preferably corresponds to 0.5 to 0.7 times, particularly preferably to 0.6 times the length a of the flotation cell. The width of the filtration unit preferably corresponds to 0.6 to 0.9 times, particularly preferably to 0.8 times the width b of the flotation cell. Thus, the filtration unit does not extend completely across the entire width of the tank as flotation cell, but rather has a small distance to the oblong side walls of the tank. In terms of height, the filtration unit is formed such that the same corresponds to the height h of the tank in a range between 0.1 and 0.4 times, preferably 0.2 to 0.3 times the height h. Other dimensions of the filtration unit applied are also of course conceivable.

In a preferred embodiment, the at least one filtration unit is present in the form of a ceramic membrane, in particular in the form of a ceramic micro or ultra filtration membrane. Such ceramic filtration membranes have a high chemical resistance and a long useful life. In addition, ceramic filtration membranes are more permeable to water and less susceptible to fouling, since they are more hydrophilic than polymer membranes. Due to their mechanical stability, no pre-screening is required. A membrane module which has a mean pore size of 20 nm to 500 nm, preferably of 100 nm to 300 nm, particularly preferably of 200 nm was found to be particularly useful.

The membrane module preferably used can consist of several membrane plates, one or multiple tubes or other geometric shapes.

A particularly useful ceramic material was found to be $\alpha\text{-}Al_2O_3$, but other ceramic oxides and non-oxides such as silicon carbide or zirconium oxide also are suitable for use in the filtration membrane.

In a further preferred embodiment the apparatus comprises at least one means for aerating the filtration unit to aerate the at least one filtration unit in a suitable manner. A suitable aeration means for example can exist in the form of perforated tubings. The aeration means can be fed with air, in order to apply great shear forces on the surface of the filtration unit to avoid or minimize fouling on the membrane surface. Further possibilities to prevent or reduce the fouling of the filtration unit include the treatment with suitable chemical substances such as citric acid for preventing an inorganic fouling, or a suitable oxidizing agent such as sodium hypochlorite for reducing the biological fouling.

In an exemplary embodiment of the present apparatus small gas bubbles, in particular air bubbles, are introduced into the purification basin via a gassing unit arranged in the contact zone. The applied gassing unit can consist of one or multiple plates or discs, tube or other geometric forms. A particular suitable material is ceramic, in particular aluminium oxide $\alpha\text{-}Al_2O_3$. Other ceramic oxides and non-oxides such as silicon carbide or zirconium oxide also are suitable. Said gassing unit can also be designated as a membrane.

In one exemplary embodiment of the present apparatus, the at least one gassing unit used therein is constructed of 1 to 10, preferably 2 to 6, particularly preferably of 4 to 6 gassing membranes. The ceramic gassing membranes used can have for instance a mean pore size of 1 μm to 10 μm, preferably 1 μm to 8 μm, particularly preferably 2 μm to 4 μm, wherein a mean pore size of 2 μm is most advantageous. The mean bubble diameter of the gas bubbles, in particular air bubbles, introduced via the gassing membrane, can lie between 10 μm and 100 μm, preferably between 20 μm and 80 μm, particularly preferably amount to 50 μm. The generation of bubbles at the gassing membrane in particular can be influenced via a suitable gas volume flow and pressure. The higher the pressure, the more and the larger bubbles are formed thereby. In the present case, the adjusted volumetric flow rate merely plays a subordinate role.

In a particularly preferred embodiment, the gassing membranes are arranged parallel to each other along the width of the tank. The number of gassing membranes correspondingly depends on the width of the tank and the dimensions of the individual gassing membranes. For example, at least four parallel gassing membranes for generating gas bubbles, in particular air bubbles, can be arranged at the bottom of the gassing tank, i.e. of the tank for receiving the water containing the flocculating agent. In general, it is also possible that the gassing membranes are arranged vertically one above the other. In this case, the number of the gassing membranes arranged one above the other depends on the height of the tank and the filling level of the tank.

The arrangement of the gassing membranes at the tank bottom can be such that the ascending gas bubbles do not get into a region between a first baffle plate (see also the explanations given below) and a side wall of the tank. Preferably, the gassing membrane is arranged with a distance from a side wall, in particular a short side wall, of the gassing tank, wherein this distance of the gassing membrane from a side wall corresponds to the distance or the opening between a baffle plate and a side wall of the gassing tank.

As mentioned previously the gas input occurs at present by a direct injection of a gas, for example air in form of tiny bubbles via the gassing membrane. The advantage of a direct injection of a gas, as for example via the described gassing unit, as compared to the DAF in particular consists in that recycle stream and saturator are omitted, since the gas, such as the air, can directly be withdrawn from a compressed-air line or a gas cylinder. This is even more favorable in the case of the precleaning of seawater for desalting, since the elevated temperature and the increased salt content of the seawater render an air saturation in connection with the DAF more difficult, since less air is dissolved in the recycle stream. Thus, no compression energy is required for reaching a high pressure level in the entire recycle stream. Due to turbulences, a part of the injected gas bubbles also can get directly into the filtration zone and thus in the vicinity of the filtration unit, before the same rise to the water surface. As a result, additional shear forces are produced at the filtration unit, which can counteract fouling. The essential advantage of the use of the present ceramic gassing unit consists in the easy and low energy generation of microbubbles.

In a further preferred embodiment of the present apparatus, at least one first baffle plate is arranged between the contact zone and the separation zone of the gassing tank for directing the flocculated organic constituents buoyed up by the gas from the contact zone into the separation zone. This first baffle plate preferably is arranged parallel to the two opposite short side walls of the gassing tank. The width b' of this at least first baffle plate preferably is equal to the width b of the gassing tank and thus equal to the length of the short side wall. The height h' of the at least one first baffle plate, however, is smaller than the height h of the tank, so that a communication between the contact zone and the separation zone is ensured in the gassing tank.

The at least one first baffle plate preferably is movably or rigidly arranged at the bottom of the tank.

In addition, the arrangement of the first baffle plate preferably is such that between the first baffle plate and the bottom of the tank an angle between 90° and 50°, preferably between 80° and 55°, particularly preferably between 75° and 60° exists. The first baffle plate preferably is aligned such that at an angle of less than 90° it is inclined in direction towards the separation zone away from the contact zone, whereby the liquid stream containing the gas bubbles, such as in the form of an agglomerate of floccules and gas bubbles, is guided in a directed way from the contact zone along the inclined first baffle plate towards the separation zone and preferably directly towards the surface of the liquid in the gassing tank in the separation zone. In a particularly preferred embodiment, the first baffle plate is arranged with an angle of 60° with respect to the tank bottom, whereby a guidance of the agglomerates of floccules and air bubbles is effected from the contact zone into the separation zone and here in particular above the filtration unit.

In one exemplary embodiment of the present apparatus, at least one second baffle plate can be arranged beside the at least one first baffle plate in the region of the contact zone on the opposite oblong side walls of the tank. The at least one second baffle plate preferably is attached to the lateral edges, which define the upwardly open side of the tank, of the opposite oblong side walls of the tank by suitable fastening means. The second baffle plate preferably is arranged such that there is a distance between the bottom of the gassing tank and the second baffle plate. In other words, the second baffle plate has no contact with the bottom of the tank. The height h" of the second baffle plate thus is smaller than the height h of the gassing tank, wherein the width b" of the second baffle plate preferably is equal to the width b of the tank and thus corresponds to the width of the short side wall of the tank.

In a particularly preferred embodiment, the first baffle plate and the second baffle plate have the same dimensions, i.e. b'=b" and h'=h".

In a further preferred embodiment of the present apparatus, the at least one first baffle plate and the at least one second baffle plate are arranged offset to each other and opposite each other, so that a meandrous flow of the water entering into the gassing tank and containing the flocculating agent can be effected. In the present case, an opposite arrangement is to be understood such that the first and the second baffle plate are attached on opposite sides of the tank. As described, the first baffle plate is arranged at the bottom of the tank and has a distance to the opposite open side of the tank, whereas the second baffle plate preferably is attached to the lateral edges of the oblong side walls of the tank, which define the upwardly open side of the tank, such that there is a distance between the bottom of the tank and the second baffle plate.

Furthermore, the second baffle plate can be arranged at the lateral edges of the oblong side walls of the tank defining the upwardly open side of the tank at an angle between 90° and 70°, preferably between 85° and 75°, particularly preferably at an angle of 80° with respect to the open side of the tank opposite the tank bottom. The second baffle plate preferably is aligned such that at an angle of less than 90° it is inclined in direction towards one of the in particular short side walls of the tank away from the separation zone. It is also conceivable that the second baffle plate is inclined away from the first short side walls of the tank.

In a preferred embodiment of the present apparatus, the filtration unit, the first baffle plate, the second baffle plate and the gassing unit are arranged one behind the other along the length a of the tank. If one follows e.g. the stream of the water containing the flocculating agent from the flocculation unit into the gassing tank, the order or sequence of the means arranged in the tank is as follows: second baffle plate, Gassing unit, first baffle plate, and filtration unit. It is also possible that there is a partial overlap of the arrangement of second baffle plate and gassing unit, since the second baffle plate can at least partly be arranged above the gassing unit. Correspondingly, on entry into the gassing tank the stream of the water containing the flocculating agent initially directly impinges onto the second baffle plate, by which the stream selectively is directed in direction of the gassing unit arranged at the bottom of the gassing tank; in the gassing unit, the stream of the water containing the flocculating agent is charged with at least one gas, in particular air, and the agglomerate of floccules and gas bubbles thus formed is guided by the first baffle plate, which preferably is arranged with an inclination, in direction of the separation zone and filtration unit. The present system correspondingly has a horizontal mode of operation.

Correspondingly, the water containing the flocculating agent from the flocculation unit can be introduced into the tank on the open upper side thereof, i.e. the flocculation mixture can be introduced into the tank from above. When the flocculation mixture is introduced into the tank from above, it is particularly preferred when the water containing the flocculating agent is introduced into a region of the gassing tank which is defined by the second baffle plate and the short side wall located nearest to the second baffle plate.

As already mentioned above, the second baffle plate can have an angle of inclination towards the nearest short side wall of the tank. The magnitude of the angle of inclination of the second baffle plate preferably is adjustable in dependence on the quantity of water flowing in and containing a flocculating agent. The angle of inclination can be adjusted such that the second baffle plate leads in direction towards the side wall of the gassing tank, but does not contact the same, so that an entry or penetration opening or surface between the second baffle plate and the nearest short side wall of the tank remains.

The penetration surface for the water containing the flocculating agent (flocculation mixture), which flows from the flocculation tank into the gassing or separation tank, preferably is adjusted such that the flow velocity of the flocculation mixture is high on the penetration surface between second baffle plate and short side wall of the tank. It is imaginable, for example, that the penetration surface has a width of 1-5 cm. The second baffle plate provides for a uniform input of the flocculation mixture across the entire width of the gassing or separation tank. The contact zone K, which is formed between the second baffle plate and the short side wall, also can be determined by the size of the penetration surface. The preferably small penetration surface of the flocculation mixture between second baffle plate and short side wall of the tank as well as the resulting high flow velocity of the flocculation mixture through the penetration gap leads to the fact that no gas bubbles ascending from the gassing unit ascend against the entry direction of the flocculation mixture into the tank.

Beside the above-mentioned input of the water containing a flocculating agent from the flocculation unit on the upper open side of the gassing tank it generally also is possible to introduce, in particular inject water containing the flocculating agent or flocculation mixture from the flocculation unit into the tank in parallel and with a small distance to the bottom of the tank. The distance between the bottom of the tank and the input of the flocculation mixture is dependent on the overall size of the tank.

The object of the present invention also is solved by means of a method for cleaning water, in particular pre-cleaning of seawater, by using the apparatus according to the invention. Such method comprises the following steps:
  introducing water containing at least one flocculating agent into at least one tank;
  contacting the water containing at least one flocculating agent with at least one gas, in particular air, introduced into a tank by means of at least one gassing unit, for forming an agglomerate of floccules and gas bubbles, in particular an agglomerate of floccules and micro gas bubbles,
  separating the agglomerate of floccules and gas bubbles risen to the surface of the water present in the tank,
  withdrawing the water liberated from the agglomerate of floccules and gas bubbles through at least one filtration unit arranged in the tank, and
  supplying the water withdrawn through the filtration unit to further treatment steps.

In one exemplary embodiment of the method, the addition of the at least one flocculating agent to the water to be cleaned is effected for flocculating organic constituents contained in the water in at least one flocculation unit upstream of the tank. The flocculation of the dissolved organic constituents contained in the seawater preferably is effected by means of known chemical substances, wherein the use of $Fe^{3+}$ or $Al^{3+}$ salts such as e.g. $FeCl_3$ was found to be particularly advantageous.

The water mixed with the flocculating agent in the flocculation unit subsequently preferably is transferred into the at least one tank in the form of a liquid stream, in which tank the liquid stream is mixed with gas bubbles, in particular air bubbles introduced into the tank via a gassing unit. The agglomerate of gas bubbles and flocculated organic constituents formed thereby rises to the surface of the liquid present in the tank, accumulates there and is separated mechanically. The water thus liberated from the majority of the organic constituents subsequently is withdrawn through the filtration unit arranged on the bottom surface of the tank and is supplied to further treatment steps.

The present method correspondingly represents a hybrid process of microflotation and membrane filtration in a single singulary apparatus unit.

BRIEF DESCRIPTION OF THE DRAWINGS

The invention will be explained in detail below by means of an exemplary embodiment with reference to the Figures of the drawings.

FIG. 4 shows a schematic representation of a method in a plant comprising an apparatus for cleaning water.

Figure 1A:
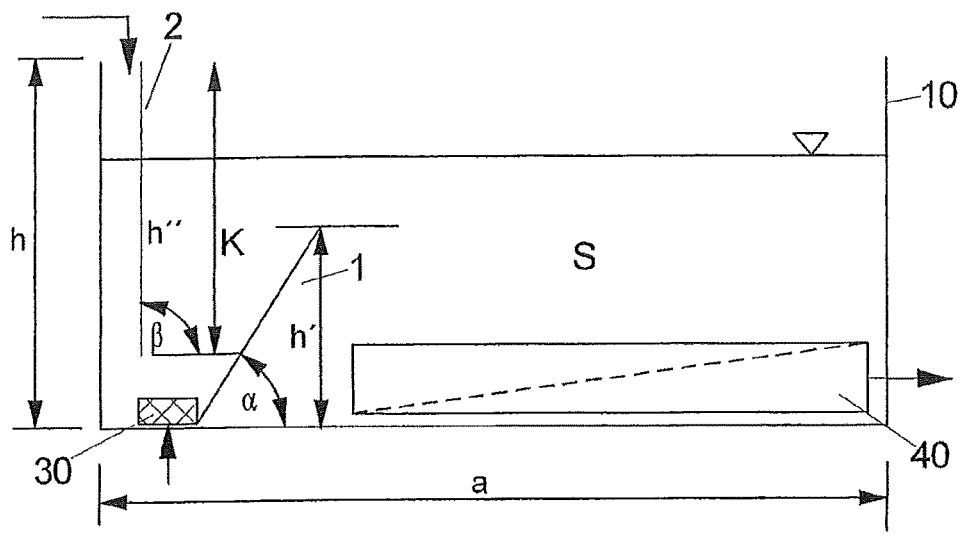
FIG. 1a shows a schematic side view of an apparatus for cleaning water according to a first embodiment.

A general structure of a first embodiment of the apparatus according to the invention is shown in FIG. 1a.

The side view of FIG. 1a comprises a gassing tank 10, a gassing unit 30, a filtration unit 40, a first baffle plate 1 and a second baffle plate 2. The tank 10 has an upper side, which is open, and a bottom surface located opposite this upper side. The gassing unit 30, the first baffle plate 1 and the filtration unit 40 are arranged along this bottom surface and on this bottom surface.

Beside the upper open side and the bottom surface, the tank 10 comprises two opposite oblong side walls and two opposite short side walls. In general, the tank 10 is formed in the form of a cuboid with a length a, a width b and a height h. The oblong side walls of the tank are defined by the length a and the height h, whereas the dimensions of the short side walls are defined by the width b and the height h of the tank.

In the present first embodiment, the length a for example is 1 m, the width b is 0.61 m and the height h is 0.5 m.

It is important to note that these dimensions merely are of an exemplary nature and in the present case only have been selected to describe and illustrate the corresponding size relations and arrangement relations of the individual components of the embodiment of the apparatus to each other, wherein in the case of a model transfer, the proportions of the individual components can be equal or at least similar to each other. It should also be noted that in the case of an increase in scale of the described embodiment of the apparatus the hydraulic similarity can be taken into account. The skilled person knows about methods as to how an up-scale of the plant and the process can be carried out proceeding e.g. from a laboratory plant or a pilot plant.

For the case that the tank 10 has the dimensions indicated above, the gassing unit 30 consisting of four individual gassing membranes is arranged at a distance of e.g. 0.1 m from a first short side wall with the width b. The gassing unit 30 extends over the complete width b of the tank 10 and consists of multiple discs, plates, tubes or other geometric forms.

Above this gassing unit 30 the second baffle plate 2 is disposed, which likewise is arranged with a distance of 0.1 m from the first short side wall and is attached to the lateral edges of the oblong side of the upper open side of the tank 10. In the first variant shown in FIG. 1a, the second baffle plate 2 is arranged vertically and hence parallel to the first short side wall. The distance between the bottom surface of the tank 10 and the second baffle plate 2 is 0.12 m in the present embodiment.

If one follows the side length a of the tank 10, the first baffle plate 1 in the present embodiment is arranged with a distance of e.g. 0.2 m from the first short side wall and attached to the bottom surface of the tank 10. The first baffle plate 1 is inclined with an angle α of 50 to 90°, for instance of 60° with respect to the bottom surface of the tank 10 away from the first short side wall towards the second short side wall of the tank 10. Correspondingly, the distance between the bottom surface of the tank 10 and the upper edge of the first baffle plate 1 is e.g. 0.26 m due to the inclination.

In viewing direction from the first short side wall along the length a of the tank 10, the filtration unit 40 is arranged behind the first baffle plate 1 with a distance of e.g. 0.39 m with respect to the first short side wall. The filtration unit 40 extends along the bottom surface up to the second short side wall and thus has a length of e.g. 0.61 m. In the case of the embodiment shown here, the height of the filtration membrane is e.g. 0.14 m and the height of the filling level of the tank 10 is e.g. 0.33 m. Thus, the filtration unit is completely immersed into the liquid present in the tank 10.

The second embodiment shown in FIG. 1b substantially corresponds to the first embodiment shown in FIG. 1a, so that in the following reference can fully be made to the explanations of the first embodiment.

Figure 1B:
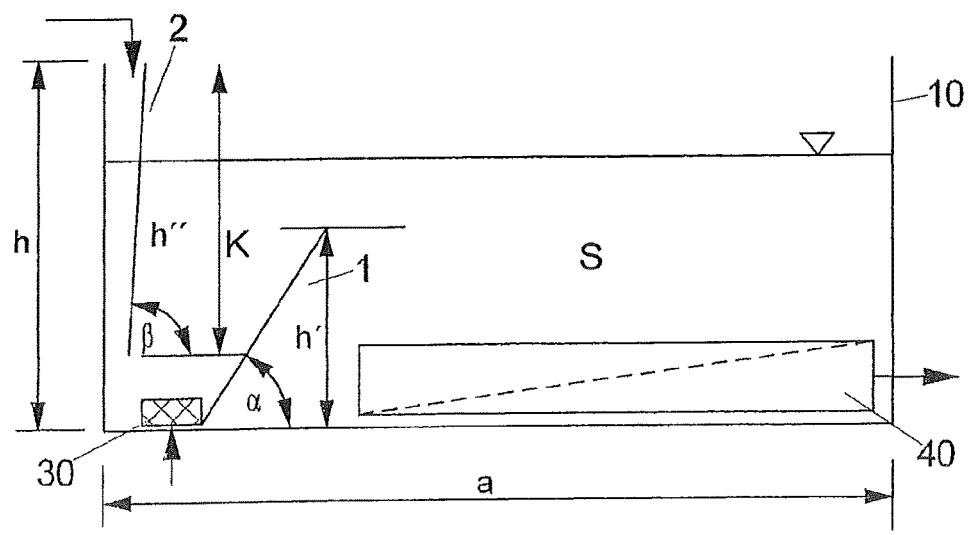
FIG. 1b shows a schematic side view of an apparatus for cleaning water according to a second embodiment.

The second embodiment of FIG. 1b differs from the first embodiment of FIG. 1 merely with regard to the angles of inclination of the second baffle plate 2. In the case of the second embodiment, the second baffle plate 2, which is attached to the upper lateral edges of the tank 10, is inclined with an angle β of 70-90°, preferably of 80° with respect to the open side of the tank 10 opposite the tank bottom in direction of the first short side wall of the tank 10. Due to the inclination of the second baffle plate 2, the distance between the first short side wall and the lower end of the second baffle plate 2 is shortened and hence the gap width for the flow of the supplied water mixed with the flocculating agent is reduced. This in turn increases the flow velocity of the flocculation mixture.

Figure 2:
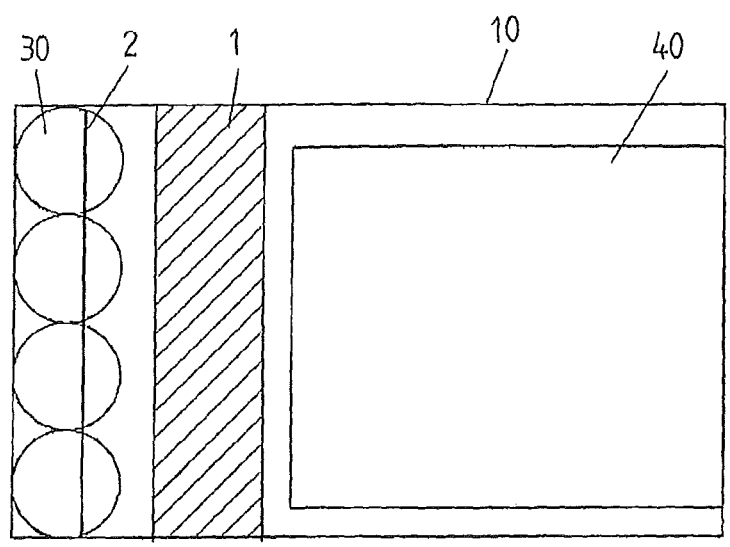
FIG. 2 shows a top view of an apparatus for cleaning water according to a third embodiment.

FIG. 2 shows a top view of the first embodiment shown in FIG. 1a, wherein here the arrangement of the four ceramic gassing membranes on the bottom surface of the gassing tank 10 is illustrated with respect to the arrangement of the first and second baffle plates 1, 2. The four ceramic gassing membranes are arranged in parallel along the first short side wall within a distance of 0.1 m from said first short side wall. In the present case, the diameter of each of the gassing membranes is 0.15 m, but can also differ from these dimensions.

Figure 3:
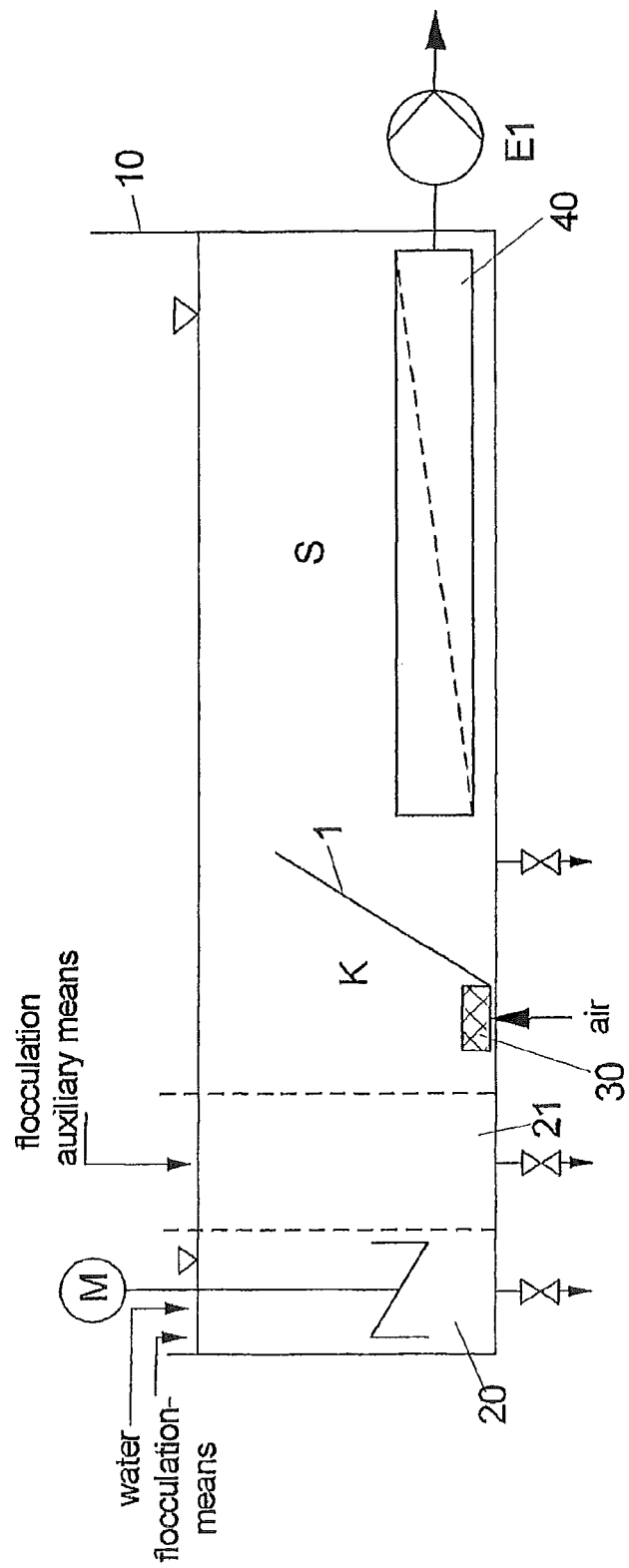
FIG. 3a schematic side view of an apparatus for cleaning water according to a third embodiment.

FIG. 3 shows a further preferred embodiment of the present apparatus. In contrast to the embodiments shown in FIGS. 1a,1b, in which the flocculation unit 20 is arranged spatially separated from the tank 10 (not shown), the flocuulation unit 20 illustrated in the embodiment shown in FIG. 3 is integrated into the tank 10.

Here a flocculation space or section 20 of the tank 10 is provided, into which the water to be purified and the flocculation means are introduced.

After mixing the water to be purified with the flocculation means for example by using a stirrer the mixture can be introduced in the upper area of the flocculation section 20 via a separating wall into a further section 21 separated from the actual flotation cell 10, to which a further flocculation auxiliary means can be added. Accordingly, the separating wall provided between flocculation section 20 and section 21 for feeding further flocculation auxiliary means can have a height which allows for an overflow of the water provided with the flocculation means form the flocculation section 20 into section 21.

After addition of the further flocculation auxiliary means in section 21 the water to be purified is led top down in section 21 and subsequently can enter the contact zone K of tank 10 at the bottom of the tank and can be guided over the gassing unit 30. Accordingly, the water to be purified shown in the embodiment of FIG. 3 is introduced meander like from the flocculation section 20 into section 21 and subsequently into the contact zone K of the flotation cell or tank 10.

In conjunction with FIG. 4, an embodiment of the method for cleaning water by using an apparatus according to the second embodiment will be described below.

In the present experimental method dirty water supplied with humic substances is used.

The entirety of organic substances in the seawater here is simulated by humic substances, which are also formed in nature by normal biological putrefaction. Humic substances are complex concatenated molecule chains of alkyl and aromatic units with functional groups, such as for example —COOH, —NH$_2$ and —RSH. Due to the ionized acid groups, negatively charged macromolecules are formed.

For flocculation of the humic substances contained in the seawater, iron- and aluminum-containing substances containing trivalent ions chiefly are recommendable as precipitating agents, which can be present in liquid or solid form. In the present case, solid $FeCl_3$ is used for preparing a liquid precipitating agent. The dirty water is mixed with the solution containing humic acids and subsequently is mixed with the solution containing $FeCl_3$ by using a static mixer in the flocculation tank 20. In the flocculation tank 20 a flocculation of the humic acids contained in the dirty water is effected by the flocculating agent $FeCl_3$.

In the present experimental method the dirty water mixed with $FeCl_3$ subsequently is introduced from the flocculation tank 20 into the separation tank or gassing tank 10 with a volumetric flow rate of 400 liters per hour. The introduction into the tank 10 is effected in a region between the first short side wall of the tank 10 and the second baffle plate 2, i.e. into a region before the second baffle plate 2. This can be done from above via the open side of the tank 10 or via the lower side of the tank 10. The second baffle plate 2 is inclined towards the short side wall with an angle β of e.g. 80°, so that due to the reduction of the gap width between side wall and second baffle plate an increase in the flow velocity of the introduced flocculation mixture occurs in direction of the gassing membrane 30 arranged at the bottom of the gassing tank 10.

Via the gassing membrane 30, which here consists of four individual gassing membranes, compressed air is injected, wherein microbubbles are formed directly in the introduced flocculation mixture. The agglomerate of floccules and air bubbles thus formed is passed along the inclined first baffle plate 1 in direction of the surface of the liquid contained in the tank 10 and thus into the separation zone S of the tank 10.

Due to the swarm character of the bubble cloud, bubbles which escape in the middle of the gas membrane have a smaller ascent rate than the outer bubbles. The higher the level of the gas membrane in the water, i.e. the larger the volume of the gas membrane present in the tank 10, the smaller the ascent rate due to the smaller bubble diameter. In general, the bubbles escape relatively uniformly over the entire membrane surface. The larger the adjusted air pressure, the more and the larger and faster bubbles are formed. When the entry gap is reduced to 1 cm, i.e. the penetration gap for the entering flocculation mixture, the entry velocity of the flocculation mixture into the contact zone K of the tank 10 lies in the same order of magnitude as the bubble ascent rate, so that the bubbles cannot ascend in the region of the penetration gap at the left edge of the basin.

Due to the attachment of the microbubbles to the flocculated particles, the same rise in direction of the surface of the liquid present in the tank 10 and form a layer of solids on the water surface, which is separated mechanically by cleaning devices for example by using scrapers. Below this layer of solids, the cleaned water is present in the separation zone S of the tank 10. The water thus precleaned is withdrawn through the immersed filtration unit 40 by using a pump E1 and is available as cleaned water for further processing, for example for further desalination processes.

To prevent fouling of the surface of the filtration unit 40, air is passed directly onto the surface of the microfiltration unit 40 via the pump E4 and via tubings provided with holes, whereby a mechanical removal of deposits on the filtration unit 40 surface is effected.

LIST OF REFERENCE NUMERALS 1 first baffle plate
2 second baffle plate
10 tank
20 flocculation unit
21 section of tank 10 for adding further flocculation auxiliary means
30 gassing unit
40 filtration unit
K contact zone of tank 10
S separation zone of tank 10
α inclination angle of first baffle plate
β inclination angle of second baffle plate

The invention claimed is:

1. An apparatus for cleaning salt water, in particular precleaning seawater, comprising
at least one tank for receiving water containing at least one flocculating agent for separating organic and possibly biological constituents contained in the water,
wherein the at least one tank comprises at least one contact zone K for contacting the water containing the flocculating agent with at least one gas, in particular air, and at least one separation zone S for separating the flocculated organic constituents buoyed up by the gas,
wherein at least one gassing unit of one or more ceramic gassing membranes with an average pore size of 2 μm is arranged in the at least one contact zone K and at least one filtration unit is arranged in the at least one separation zone S, and
wherein the gassing unit is directly connected to a compressed-gas line or a gas cylinder such that the at least one gas is injected directly into the at least one tank via the at least one gassing unit without using a liquid carrier.

2. The apparatus according to claim 1, wherein the at least one filtration unit and the at least one gassing unit are arranged horizontally offset to one another.

3. The apparatus according to claim 1, wherein the tank is a tank open on an upper surface opposite the bottom surface of the length a, the width b and the height h with two oblong and two short side walls.

4. The apparatus according to claim 1, wherein the at least one filtration unit is arranged in the tank below the layer formed by the flocculated organic constituents buoyed up, in particular at the bottom of the tank, within the separation zone S.

5. The apparatus according to claim 1, wherein the at least one filtration unit is a ceramic filtration membrane, in particular a ceramic microfiltration membrane or ultrafiltration membrane.

6. The apparatus according to claim 1, wherein the at least one filtration unit is a membrane module with a mean pore size of 20 to 500 nm, preferably of 100 to 300 nm, particularly preferably of 200 nm.

7. The apparatus according to claim 1, further including at least one means for aerating the at least one filtration unit.

8. The apparatus according to claim 1, wherein the at least one gassing unit is constructed of 1 to 10, preferably 2 to 8, particularly preferably of 4 to 6 gassing membranes.

9. The apparatus according to claim 1, wherein the at least one gassing unit is constructed of ceramic gassing membranes arranged in parallel and/or vertically one above the other.

10. The apparatus according to claim 1, wherein between contact zone K and separation zone S at least one first baffle plate is arranged for directing the flocculated organic constituents buoyed up by the gas from the contact zone K into the separation zone S.

11. The apparatus according to claim 10, wherein the first baffle plate is movably or rigidly arranged at the bottom of the tank.

12. The apparatus according to claim 10, wherein the first baffle plate is arranged with an angle α between 90 and 50°, preferably between 80 and 55°, particularly preferably between 75 and 60° with respect to the bottom of the tank.

13. The apparatus according to claim 1, wherein at least one second baffle plate is arranged in the region of the contact zone K on opposite oblong side walls of the tank.

14. The apparatus according to claim 13, wherein the second baffle plate is arranged such that there is a distance between the bottom of the tank and the second baffle plate.

15. The apparatus according to claim 13, wherein the first baffle plate and the second baffle plate are arranged offset to each other and opposite each other, so that a meandrous flow can be effected by the baffle plates.

16. The apparatus according to claim 13, wherein the second baffle plate is arranged on the side walls of the tank at an angle β between 90 and 70°, preferably between 85 and 75°, particularly preferably 80° with respect to the open upper side of the tank opposite the tank bottom.

17. The apparatus according to claim 1, wherein the water containing the flocculating agent is introduced into the tank on the open upper side of the same.

18. The apparatus according to claim 17, wherein the water containing the flocculating agent is introduced into a region of the tank which is defined by a second baffle plate and a short side wall of the tank located nearest to the second baffle plate.

19. The apparatus according to claim 1, further including at least one flocculation unit upstream of the tank for receiving the water to be cleaned and at least one flocculating agent for flocculating organic constituents contained in the water.

20. The apparatus according to claim 1, wherein at least one flocculation unit and the tank are in liquid communication with each other for the transport of the organic constituents flocculated in the flocculation unit by means of a liquid stream from the flocculation unit into the tank.

21. A method for cleaning salt water, in particular precleaning seawater, by using an apparatus according to claim 1, comprising the following steps:
introducing water containing at least one flocculating agent into at least one tank;
contacting the water containing at least one flocculating agent with at least one gas, in particular air, introduced into the tank by means of at least one gassing unit of one or more ceramic gassing membranes with an average pore size of 2 μm, for forming an agglomerate of floccules and gas bubbles, in particular an agglomerate of floccules and micro gas bubbles, wherein the at least one gas is injected directly into the at least one tank via the at least one gassing unit without using a liquid carrier,
separating the agglomerate of floccules and gas bubbles risen to the surface of the water present in the tank, withdrawing the water liberated from the agglomerate of floccules and gas bubbles through at least one filtration unit arranged in the tank, and supplying the water withdrawn through the filtration unit to further treatment steps.

22. The method according to claim 21, wherein the addition of the at least one flocculating agent to the water to be cleaned is effected for flocculating organic constituents contained in the water in at least one flocculation unit upstream of the tank.

23. The method according to claim 22, wherein the water mixed with the flocculating agent in the flocculation unit is transferred into the at least one tank in the form of a liquid stream.

* * * * *